Dec. 11, 1951     A. McPHERSON ET AL     2,578,260
APPARATUS FOR LUBRICATING WIRE ROPES OR CABLES
Filed April 28, 1947     2 SHEETS—SHEET 2
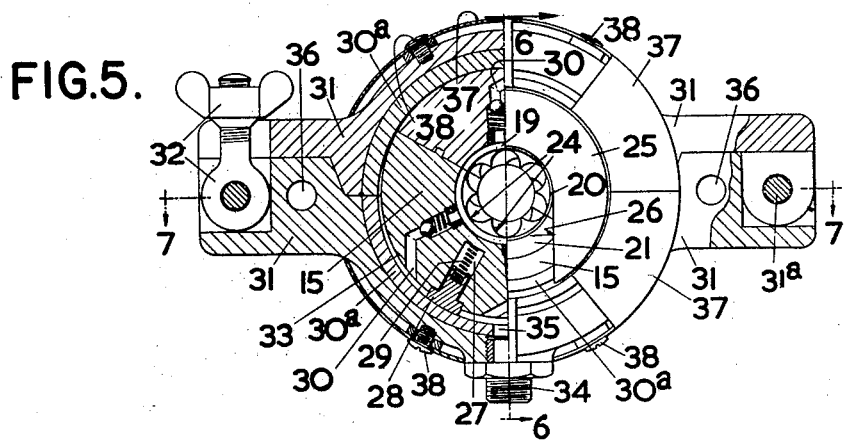
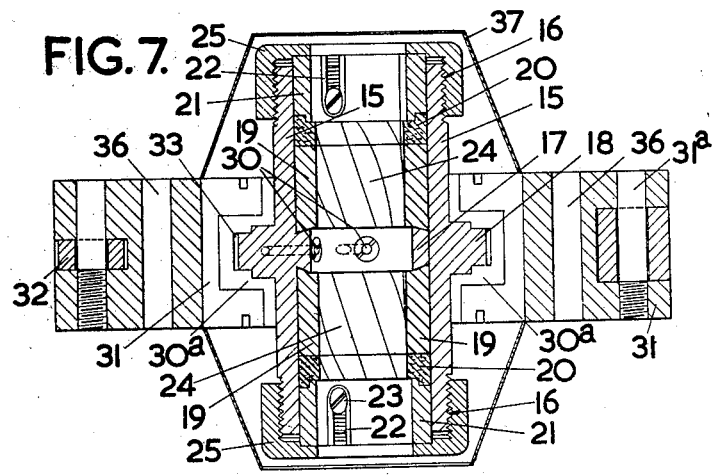
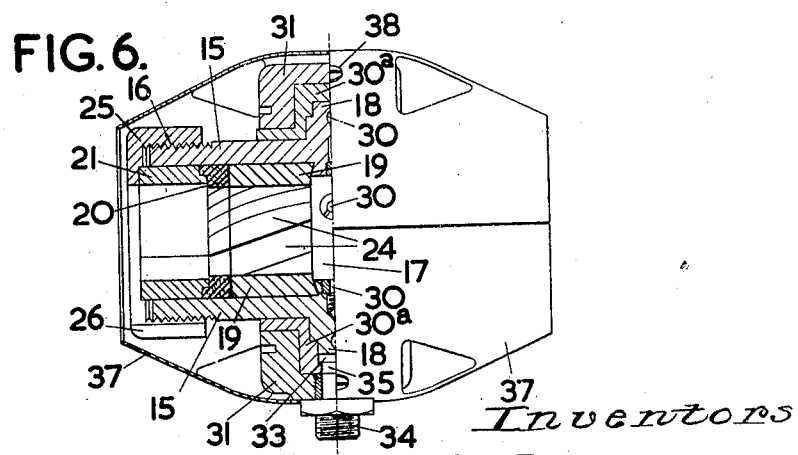

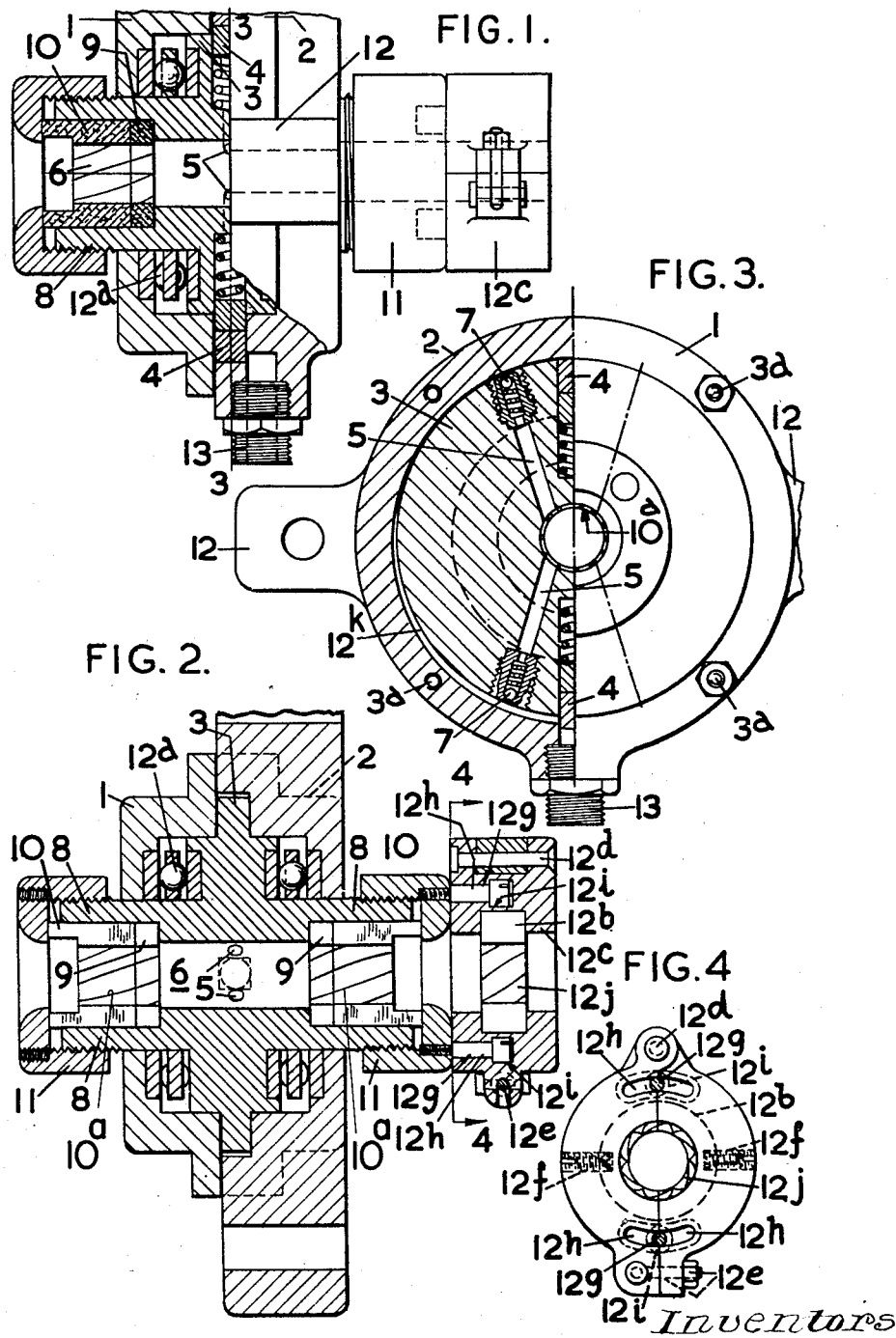

UNITED STATES PATENT OFFICE 2,578,260

APPARATUS FOR LUBRICATING WIRE ROPES OR CABLES

Alexander McPherson and William Barton Bird, Glasgow, Scotland

Application April 28, 1947, Serial No. 744,316
In Great Britain May 16, 1946

5 Claims. (Cl. 184—15)

This invention has reference to means for lubricating wire ropes or cables hereafter referred to as ropes and has for its object to provide an improved apparatus by which wire ropes can be lubricated automatically.

Two embodiments of the invention will now be described with reference to the annexed drawings wherein:

Figure 1 is an elevation, partly in section, of one construction of device in accordance with the invention.

Figure 2 is a sectional plan view thereof, and

Figure 3 is an end elevation partly in section, the section being on the line 3—3 of Figure 1.

Figure 4 is a section on the line 4—4 of Figure 2.

Figure 5 is an elevation, partly in section of another form of apparatus in accordance with the invention.

Figure 6 is an end elevation thereof, partly in section, the section being on the line 6—6 of Figure 5, and Figure 7 is a sectional plan view, the section being on the line 7—7 of Figure 5.

According to the construction shown in Figures 1 to 4 the apparatus embodies a pump casing formed of two circular co-operating parts 1 and 2 secured together by bolts and nuts $3^a$ and in which is housed the rotor 3 of the pump. This rotor carries two spring loaded vanes 4 which are urged outwards to make a wiping contact with the inner face of the casing, the axis of rotation of the rotor being eccentric to that of its casing. Located in the rotor are four lubricant ducts 5 which at their inner ends communicate with the bore 6 of the rotor and at their outer ends are provided with spring loaded non-return valves 7.

The ducts are so disposed that one is immediately in front of each vane and another at the rear thereof.

The rotor is provided with bosses 8 which extend through the pump casing and constitute stuffing boxes for the reception of packing 9 and also for the reception of lignum vitae, fibre or like bushes 10. The said packing and bushes are formed of semi-circular sections. Said bushes are rifled or provided with spiral channels as at $10^a$ shaped to correspond with the spirals of the rope to be lubricated. Caps or flanged nuts 11 screwed on the outer ends of the bosses serve to clamp the said bushes so that they are non-rotatable in the bosses.

The pump casing is provided with lugs 12 by which it can be anchored to a fixture and is also provided with a lubricant inlet 13 connected by a pipe or otherwise with a lubricant reservoir, the lubricant being supplied under pressure by means of a spring loaded plunger, gravity or otherwise.

Anti-friction thrust bearings $12^a$ are provided between the rotor and its casing.

To clean the rope prior to it being lubricated we may provide the apparatus with a further bush $12^b$ formed of two half sections and housed in a casing $12^c$ formed of two half sections hinged together at $12^d$ and locked by means of a hinged bolt and nut $12^e$. The two bush sections are secured to their respective half casing by means of screws $12^f$.

Screwed in one of the caps or flanged nuts 11 are two pins $12^g$ having enlarged heads. Each section forming the casing $12^c$ is provided with two arcuate slots $12^h$ which are enlarged as at $12^i$. The slots receive the pins $12^g$ and the enlarged heads of the pins fit into the enlarged parts of the slots so that the casing $12^c$ together with its bush, which is rifled or provided with spiral grooves at $12^j$, are capable of a circumferential adjustment with respect to the cap or flanged nut.

In using the apparatus the caps or flanged nuts 11 are removed, the packing 9, the sections forming the bushes 10 withdrawn and the rope to be lubricated is threaded through the rotor. Thereafter the packing 9 and bush sections are replaced and the caps or flanged nuts screwed on the ends of the rotor to clamp said bushes tightly in the rotor.

The sections forming the casing $12^c$ together with its bush sections which have been previously opened outwards about the hinged pin $12^d$ are then brought together so that the bush $12^b$ then encircles the rope. The said arcuate slots permit the bush sections to partake of a circumferential adjusting movement so that they register with the helical wires or strands of the rope.

The said casing $12^c$ with its bush must be secured to the leading side of the apparatus so that the rope must travel through said bush prior to passing through the body of the apparatus.

It will be apparent that when the rope is drawn through the bushes 10 the latter will be rotated and the rotor will be carried round by the bushes.

The lubricant trapped by each vane in the crescent shape space $12^k$ between the wall of casing and the rotor is forced past the non-return valve 7 in the duct 5 in front and then through said duct to lubricate the rope as it passes through the bore of the rotor.

Prior to passing through the rotor the rope passes through the bush 12$^b$ which serves to clean the rope as it passes therethrough. This bush rotates with its housing which latter rotates in unison with the cap 11 to which it is attached and the cap rotates together with the rotor.

When the direction of travel of the rope is reversed the direction of rotation of the rotor is likewise reversed, the lubricant being forced through the ducts immediately in front of the vanes. The cap or flanged nut carrying the bush 12$^b$ and its casing is then secured to what then constitutes the leading end of the apparatus.

The apparatus illustrated in Figures 5, 6 and 7 is provided with a body portion in the form of two semi-cylindrical sections 15, 15 which together form a cylindrical body portion with end bosses externally screw threaded towards each end thereof as at 16 and towards the centre thereof provided with an internal annular ring 17 and an external annular ring or disc 18, the latter forming the rotor of a pump.

Each side face of the inner annular ring is angled inwardly towards its base and into the body portion is fitted bushes 19 angled at their inner ends to fit said angled faces, each of the bushes being formed of two co-operating semi-circular sections.

Bearing on each of said bush sections is a semi-circular packing 20 and on the outer end of each of said packings bear compression rings 21, each of said rings being of two semi-circular sections and co-operating to hold the packing sections. Each ring section is provided with a longitudinal slot 22, and a cheese headed screw 23 passes through each slot and is threaded into the corresponding semi-cylindrical body section.

Thus each semi-circular body section carries four semi-circular bush sections, two semi-circular packings and two semi-circular compression rings, all held in their assembled position so that when the two body sections are placed together they form the complete body portion with two complete bushes, packing and end compression rings.

Each bush section is rifled or provided on its inner circumference with spiral channels as at 24 shaped to correspond with the spirals of the rope to which the device is fitted.

Threaded on the ends of the screw threaded ends of the body portions are flanged nuts or caps 25 by which the compression rings can be forced axially inwards to compress the packing and said nuts are cut away at one side as at 26, so that they can be slipped transversely on the rope.

The aforesaid external annular ring or disc 18 is provided with diametrically opposite recesses 27 in each of which is located a vane 28 urged outwards by a compression spring 29. On each side of each of said recesses are lubricant ducts 30 which lead to the interior of the body portion, each duct having a non-return valve.

Enclosing the aforesaid ring or disc which constitutes the pump rotor and which contains the vane is a pump casing formed of two semi-circular casing sections 30$^a$, 30$^a$. Said casing is enclosed within an outer casing 31 likewise formed of two sections each having lugs hinged together at one side, as at 31$^a$ and at the other side interconnected by a hinge bolt and nut 32.

Said pump casing is provided with a circular recess 33 the centre of which is eccentric to that of the body portion and the aforesaid vanes 28 are urged against the circular wall of the recess.

One of said sections is connected by means of a coupling 34 to a lubricant receptacle which may be provided with means, e. g. a spring loaded plunger, whereby the lubricant is fed to the pump under pressure. It may however be fed by gravity. Said coupling communicates by means of a port 35 with the crescent space formed between the ring or disc 18 and the wall of the recess 33.

The lugs of one of the sections of the outer casing is provided with bolt holes 36 so that it can be secured to a suitable fixture.

The apparatus is provided with a cover 37, likewise formed of two sections, and secured to outer casing 30 by screws 38.

In use in order to fit the apparatus to a rope the body portion is rotated until the joint of the two sections thereof lie in the plane of the joint of the pump casing and outer casing, a suitable mark on the body portion registering with a mark on the pump casing when in such position.

The flanged nuts 25 are removed and, by easing off the nut 32, the upper sections of the outer casing, pump casing, and body portion complete with bush, packing and compression ring sections can then be turned about the hinge 36. The rope is then introduced to the half bushes in the lower half of the body portion. The aforesaid upper sections are then swung into position to clamp the rope and are retained in such position by means of the hinged bolt and nut 32. The flanged nuts 25 are then replaced.

As the rope travels through the apparatus a rotary movement is imparted to the body portion, the bushes acting as nuts so that they are rotated by the rope or cable and impart a corresponding movement to the body portion.

As the body portion rotates the vanes 28 which rotate therewith partake of an inward and outward radial movement, the lubricant being trapped in the crescent shape space between the disc and its casing and thereafter, as the retaining space becomes smaller and smaller, is forced through one or the other of the ducts, such lubricant being thus supplied under pressure to lubricate the rope travelling through the device.

When the rope is lubricated the apparatus can be easily and quickly detached therefrom so that there is no necessity for the end of the rope to be passed therethrough. The apparatus can then in like manner be fitted to lubricate a rope of similar diameter although it will be understood that the same device may be utilised to lubricate various ropes of the same diameter but varying slightly in pitch. Further, by introducing bushes and packing of different internal diameters the apparatus may be used to lubricate ropes of different diameters.

The apparatus described with reference to Figures 5 to 7 may likewise be provided with a cleaning bush by which the rope is cleaned prior to being lubricated.

We claim:

1. An apparatus for lubricating wire ropes comprising a pump casing for connection to a fixture and to a lubricant supply, a rotor eccentrically mounted within the casing and having a central axial hole for the passage of the rope therethrough and at least one lubricant duct terminating at its outer end at the periphery of the rotor and at its inner end at the aforesaid hole, at least one sliding vane carried by the rotor and bearing on the inner face of the pump casing, and a rope encircling member internally threaded to correspond with the wires of the rope and operatively connected to the rotor so that, when the rope is drawn therethrough, the pump rotor is rotated relative to its casing to force the lubricant under pressure from the pump casing through the rotor directly to the rope.

2. An apparatus for lubricating wire ropes comprising a pump casing for connection to a fixture and to a lubricant supply, a rotor eccentrically mounted within the casing and having a central axially extending hole for the passage of the rope to be lubricated and at least one lubricant duct terminating at its outer end at the periphery of the rotor and at its inner end at the aforesaid hole, at least one sliding vane carried by the rotor and bearing on the inner face of the pump casing, bosses extending from each side of the rotor, packing inserted in said bosses, nuts screwed on the bosses to compress the packing, and a member operatively connected to the rotor and internally threaded to correspond with the wires of the rope to be lubricated, said member being rotated when the rope is drawn therethrough, and driving the rotor which then forces lubricant under pressure from the pump casing directly to the rope as it passes through the rotor.

3. An apparatus for lubricating wire ropes comprising a pump casing for connection to a fixture and to a lubricant supply, a rotor eccentrically mounted within the casing and having a central axial hole for the passage of the rope therethrough and at least one lubricant duct terminating at its outer end at the periphery of the rotor and at its inner end at the aforesaid hole, a sliding vane carried by the rotor and bearing on the inner face of the pump casing, a rope encircling member internally threaded to correspond with the wires of the rope to be lubricated and connected to the rotor so that, when the rope is drawn therethrough, the pump rotor is rotated relative to its casing to force the lubricant under pressure from the pump casing through the rotor directly on to the rope, and an internally threaded member carried by said rotor and arranged to enclose and clean the rope prior to the rope entering the rotor of the pump.

4. An apparatus for lubricating wire ropes comprising a supporting casing formed of two longitudinal sections, a pump casing carried thereby and likewise formed of two sections, a rotor eccentrically mounted with respect to the casing and having a central axial hole for the passage therethrough of the rope to be lubricated and lubricant ducts terminating at their inner ends at the aforesaid hole and at their outer ends at the periphery of the rotor, non-return valves provided in said ducts, spring loaded vanes carried by said rotor and bearing on the inner face of the pump casing, cylindrical extensions on each side of the rotor packing fitted in said extensions, nuts screwed on said extensions by which packing therein can be placed under pressure and a member internally threaded to correspond to the wires of the rope to be lubricated and through which such rope can be passed, the member being secured to the rotor by the packing bearing thereon, so that rotation of said member by the rope is transmitted to the rotor whereby lubricant is forced thereby to the rope.

5. An apparatus for lubricating wire ropes comprising a supporting casing formed of two longitudinal sections, a pump casing carried thereby and likewise formed of two sections, a rotor eccentrically mounted with respect to the casing and having a central axial hole for the passage therethrough of the rope to be lubricated and lubricant ducts terminating at their inner ends at the aforesaid hole and at their outer ends at the periphery of the rotor, non-return valves provided in said ducts, spring loaded vanes carried by said rotor and bearing on the inner face of the pump casing, cylindrical extensions on each side of the rotor, packing inserted in said extensions, nuts screwed on said extensions to compress the packing, bushes internally threaded to correspond to the wires of the rope to be lubricated and fitted within the rotor, the packing bearing thereon so that they are secured to the rotor, said bushes when the rope is drawn therethrough are rotated and drive the rotor, and a bush rifled internally to correspond to the wires of the rope and mounted on the end of the apparatus so that the rope will be cleaned thereby prior to passing through the rotor to be lubricated.

ALEXANDER McPHERSON.
WILLIAM BARTON BIRD.

REFERENCES CITED

The following references are of record in the file of this patent:

UNITED STATES PATENTS

| Number | Name | Date |
|---|---|---|
| 2,140,426 | Hodson | Dec. 13, 1938 |
| 2,370,314 | Jenner | Feb. 27, 1945 |

FOREIGN PATENTS

| Number | Country | Date |
|---|---|---|
| 193,950 | Great Britain | Feb. 28, 1923 |
| 314,324 | Italy | Jan. 23, 1934 |